(12) United States Patent
Takahashi et al.

(10) Patent No.: US 11,179,929 B2
(45) Date of Patent: Nov. 23, 2021

(54) INFORMATION PROCESSING APPARATUS AND COMPUTER READABLE MEDIUM

(71) Applicant: FUJIFILM Business Innovation Corp., Tokyo (JP)

(72) Inventors: Ryosuke Takahashi, Kanagawa (JP); Yasuhiro Otsuka, Yokohama (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 0 days.

(21) Appl. No.: 17/004,200

(22) Filed: Aug. 27, 2020

(65) Prior Publication Data

US 2021/0245499 A1    Aug. 12, 2021

(30) Foreign Application Priority Data

Feb. 12, 2020    (JP) .............................. JP2020-021567

(51) Int. Cl.
*B41J 2/045*    (2006.01)
(52) U.S. Cl.
CPC ....... *B41J 2/04508* (2013.01); *B41J 2/04558* (2013.01); *B41J 2/04586* (2013.01)
(58) Field of Classification Search
CPC . B41J 2/04508; B41J 2/04558; B41J 2/04586
See application file for complete search history.

(56) References Cited

U.S. PATENT DOCUMENTS 7,484,822 B2 * 2/2009 Yamanobe ............. B41J 2/2132
                                                              347/15
2014/0055517 A1 * 2/2014 Mizuno ..................... B41J 2/21
                                                              347/15

FOREIGN PATENT DOCUMENTS

JP             4720274            4/2011

OTHER PUBLICATIONS

English language machine translation of JP 4720274.

* cited by examiner

*Primary Examiner* — Lamson D Nguyen
(74) *Attorney, Agent, or Firm* — Fildes & Outland, P.C.

(57) ABSTRACT

An information processing apparatus includes a processor configured to: acquire physical property information on physical properties of a recording medium and on physical properties of ink to be ejected onto the recording medium and setting information on a setting of a device configured to eject the ink onto the recording medium, the ink including a first ink and a second ink; derive a feature quantity relating to characteristics of the ink by estimating behavior of a first ink to be ejected onto the recording medium and of a second ink to be ejected to a position adjacent to the first ink ejected, using the physical property information and the information on a setting to derive a feature quantity relating to characteristics of the recording medium; and output the feature quantity.

17 Claims, 6 Drawing Sheets

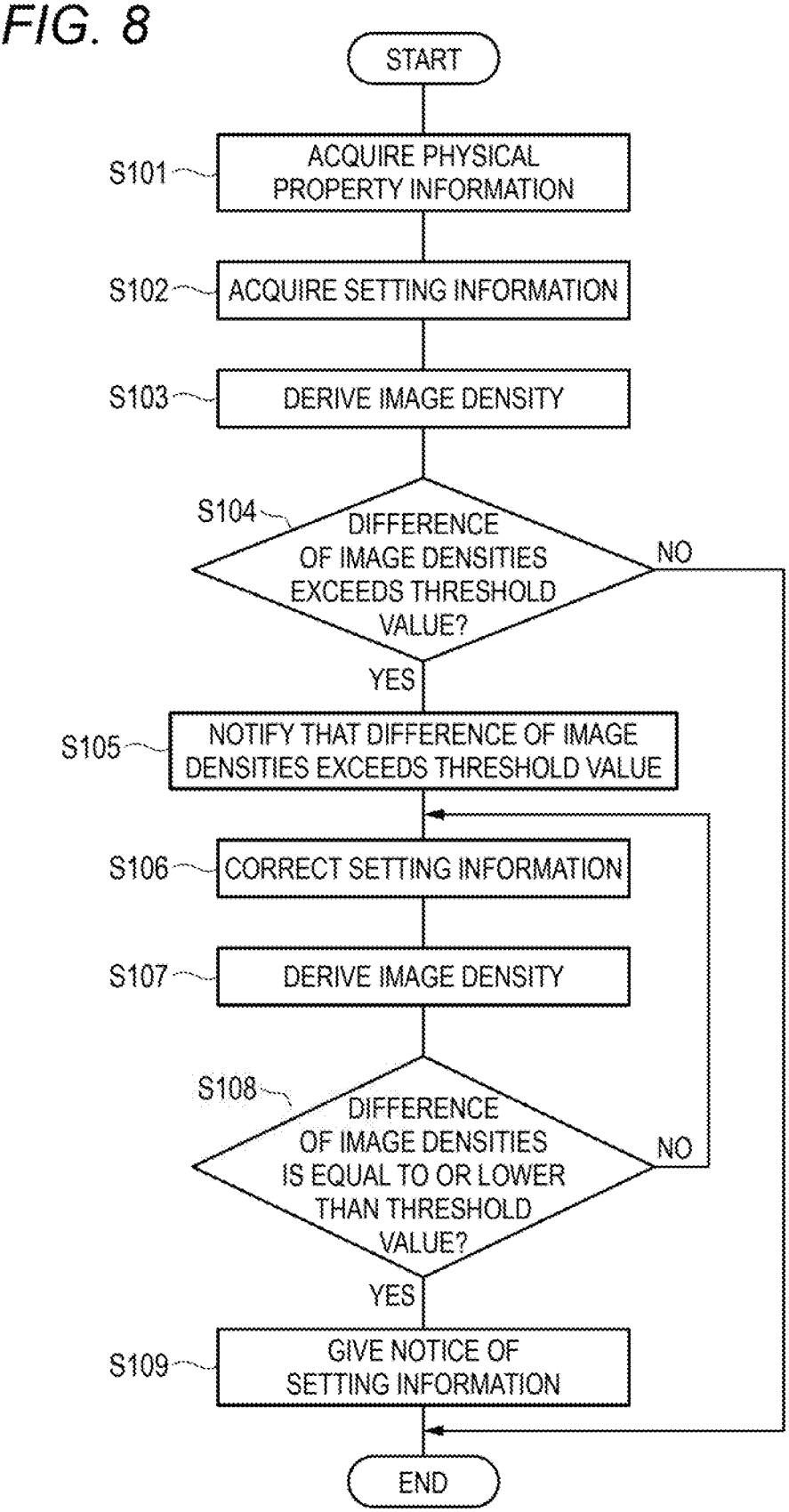

INFORMATION PROCESSING APPARATUS AND COMPUTER READABLE MEDIUM

CROSS-REFERENCE TO RELATED APPLICATIONS

This application is based on and claims priority under 35 USC 119 from Japanese Patent Application No. 2020-21567 filed on Feb. 12, 2020.

BACKGROUND

Technical Field

The present disclosure relates to an information processing apparatus and a computer readable medium.

Related Art

Japanese Patent No. 4720274 discloses an apparatus for simulating a shape of ink dots formed on a print medium at a time of printing a printed image, the apparatus including: a peripheral duty indicating a total amount of ink of ink dots to be formed in a peripheral area set around a pixel of interest; a reference data storage unit that stores dot shape data indicating a relationship with a spread shape of ink dots to be formed in the pixel of interest; a dot data generation unit that generates dot data indicating a formation state of the ink dots of each pixel on the print medium; a dot shape calculation unit that calculates the spread shape of each ink dot to be formed on the print medium according to the dot data by referring to the dot shape data; and an image quality evaluation index calculation unit that calculates an image quality evaluation index for evaluating an image quality of the print based on the spread shape of each ink dot calculated by the dot shape calculation unit.

SUMMARY

In an ink jet recording type image forming apparatus, there is a technique of evaluating an image to be formed on a recording medium by simulating a behavior of an ink that wets the recording medium and spreads on the recording medium when the ink is ejected onto the recording medium.

However, the number of ink droplets ejected onto the recording medium is enormous, and enormous calculation processing is required to simulate a behavior of each ink droplet for an entire region to be printed. Since the behavior of the ink changes according to a setting (hereinafter referred to as "setting information") of the image forming apparatus at a time of printing that is related to the recording medium, the ink, and the like, it takes a lot of time to reflect the setting information and simulate the accurate behavior of the ink.

Aspects of non-limiting embodiments of the present disclosure relate to an information processing apparatus and a computer readable medium storing a program with which processing time for deriving information on a quality of an image to be formed on a recording medium may be reduced, as compared with a case of simulating a behavior of each ink for an entire region to be printed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: acquire physical property information on physical properties of a recording medium and on physical properties of ink to be ejected onto the recording medium and setting information on a setting of a device configured to eject the ink onto the recording medium, the ink including a first ink and a second ink; derive a feature quantity relating to characteristics of the ink by estimating behavior of a first ink to be ejected onto the recording medium and of a second ink to be ejected to a position adjacent to the first ink ejected, using the physical property information and the information on a setting to derive a feature quantity relating to characteristics of the recording medium; and output the feature quantity.

BRIEF DESCRIPTION OF DRAWINGS

Exemplary embodiment(s) of the present invention will be described in detail based on the following figures, wherein:

FIG. 8 is a flowchart showing an example of information processing according to the present exemplary embodiment.

DETAILED DESCRIPTION

An exemplary embodiment of the present disclosure will be described in detail below with reference to the drawings. An information processing apparatus 10 according to the present exemplary embodiment is, for example, a server configured to acquire a setting value from an image forming apparatus and to evaluate an image to be formed using acquired information. However, the present invention is not limited thereto. The information processing apparatus 10 may be, for example, a terminal such as a personal computer and a tablet, or an image forming apparatus.

Figure 1:
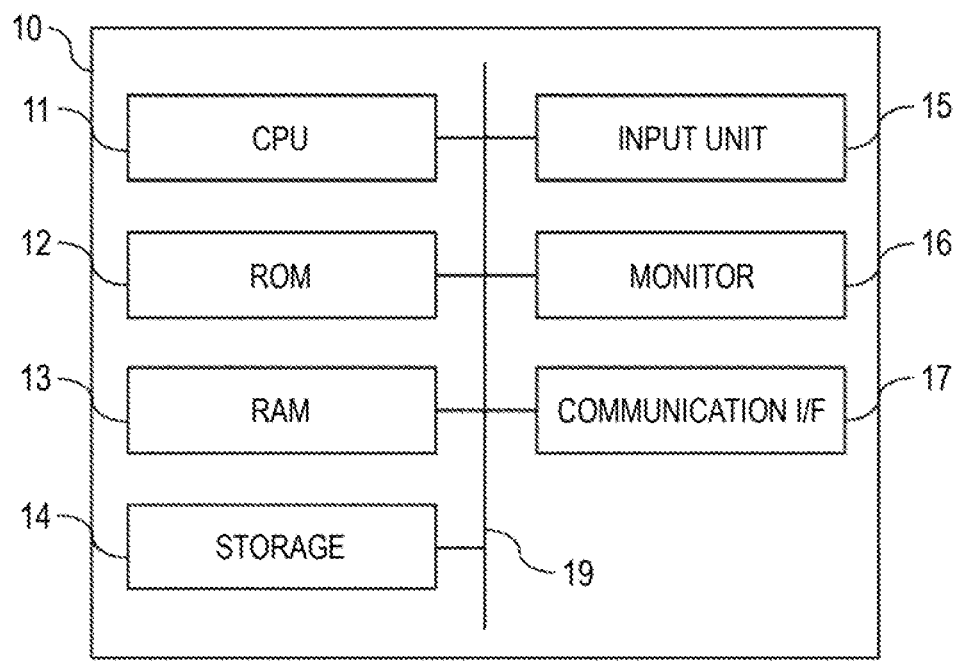
FIG. 1 is a block diagram showing an example of a hardware configuration of an information processing apparatus according to an exemplary embodiment.

A hardware configuration of the information processing apparatus 10 will be described with reference to FIG. 1. FIG. 1 is a block diagram showing an example of the hardware configuration of the information processing apparatus 10 according to the present exemplary embodiment. As shown in FIG. 1, the information processing apparatus 10 according to the present exemplary embodiment includes a central processing unit (CPU) 11, a read only memory (ROM) 12, a random access memory (RAM) 13, a storage 14, an input unit 15, a monitor 16, and a communication interface (communication I/F) 17. The CPU 11, the ROM 12, the RAM 13, the storage 14, the input unit 15, the monitor 16, and the communication I/F 17 are connected to one another by a bus 19. Here, the CPU 11 is an example of a processor.

The CPU 11 is configured to control the entire information processing apparatus 10. The ROM 12 is configured to store various programs and data including an information processing program used in the present exemplary embodiment. The RAM 13 is a memory used as a work area when the various programs are executed. The CPU 11 is configured to execute information processing by loading the program stored in the ROM 12 into the RAM 13 and executing the program. The storage 14 is, for example, a hard disk drive (HDD), a solid state drive (SSD), a flash memory, or the like. The storage 14 may store information related to the information processing program and various data acquired from the image forming apparatus. The input unit 15 is a mouse and a keyboard that are configured to input characters and the like. The monitor 16 is configured to display image data, characters, and the like. The communication I/F 17 is configured to transmit and receive data.

Figure 2:
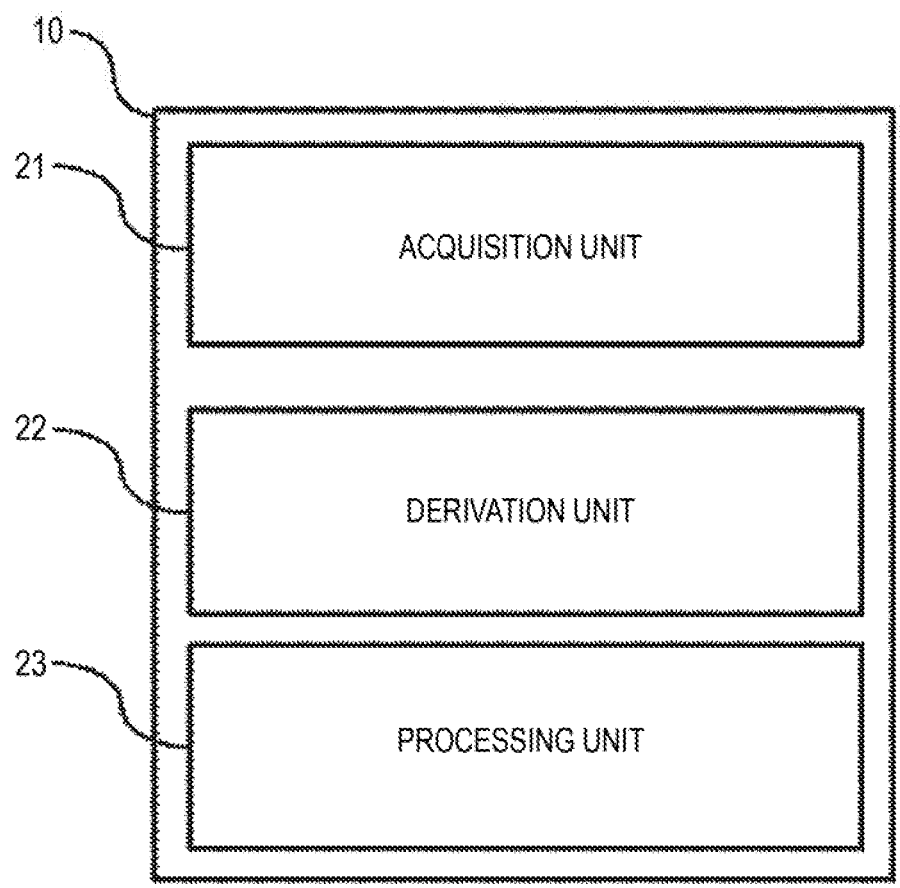
FIG. 2 is a block diagram showing an example of a functional configuration of the information processing apparatus according to the present exemplary embodiment.

Next, a functional configuration of the information processing apparatus 10 will be described with reference to FIG. 2. FIG. 2 is a block diagram showing an example of the functional configuration of the information processing apparatus 10 according to the present exemplary embodiment.

As shown in FIG. 2, the information processing apparatus 10 includes an acquisition unit 21, a derivation unit 22, and a processing unit 23. The CPU 11 executes the information processing program to function as the acquisition unit 21, the derivation unit 22, and the processing unit 23.

The acquisition unit 21 is configured to acquire information (hereinafter referred to as "physical property information") on physical properties of a recording medium and physical properties of an ink to be ejected onto the recording medium and information (hereinafter referred to as "setting information") on a setting of the image forming apparatus that ejects the ink onto the recording medium. Here, the physical properties of the recording medium acquired by the acquisition unit 21 are, for example, surface tension, an average pore diameter, and surface uneven shape distribution of the recording medium, and the physical properties of the ink are surface tension and viscosity of the ink. The setting of the image forming apparatus is a volume of the ink to be ejected, a distance between nozzles, a printing speed, a distance between heads, and a ratio (hereinafter referred to as "image density") of the ink to the recording medium. A mode will be described in which the image density according to the present exemplary embodiment is a degree of absorption of light applied to an image formed on the recording medium. However, the present invention is not limited thereto. The image density may be a degree of reflection of the light applied to the image formed on the recording medium, a total area of the ejected inks with respect to an area of the recording medium, or a ratio of the number of the ejected inks to the number of pixels of the recording medium.

The derivation unit 22 is configured to, using the physical property information and the setting information, estimate behaviors of a first drop of the ink and a second drop of the ink ejected to a position adjacent to the first drop of the ink and derive a feature quantity relating to characteristics of the recording medium. Here, the first drop of the ink is an example of a first ink, and the second drop of the ink is an example of a second ink. Specifically, the derivation unit 22 derives the image density of the image to be formed on the recording medium as the feature quantity.

The derivation unit 22 derives the image density using a ratio (hereinafter referred to as "ink area ratio".) of an area of the ejected ink to the recording medium and a remaining amount of the ink which remains on the recording medium.

The derivation unit 22 derives the remaining amount of the ink which remains on the recording medium using a permeation amount of the first drop of the ink, and derives the ink area ratio of the recording medium using a wetting and spreading width of the first drop of the ink.

The processing unit 23 is configured to output the derived feature quantity, and to evaluate a quality of an image to be formed on the recording medium using the feature quantity. Specifically, in a case where a difference between the feature quantity and a feature quantity that is designated by a user (hereinafter referred to as "designated amount") and is included in the setting information exceeds a predetermined threshold value, the processing unit 23 gives notice that the quality of the image is poor, or derives the setting information (for example, the printing speed) to achieve the difference to be lower than the predetermined threshold value or gives notice of it.

A mode has described in which the processing unit 23 according to the present exemplary embodiment performs the notification when the difference exceeds the predetermined threshold value. However, the present invention is not limited thereto. When the difference exceeds the threshold value, the processing unit 23 may change the setting information to correct the feature quantity such that the difference is the threshold value or lower. The processing unit 23 may change the printing speed included in the setting information to correct the feature quantity such that the difference is the threshold value or lower. The threshold value according to the present exemplary embodiment is not particularly limited. For example, a predetermined value may be set as the threshold value, or magnitude corresponding to any ratio of the derived image density and the designated amount may be set as the threshold value.

Next, a method of deriving the feature quantity according to the present exemplary embodiment will be described with reference to FIGS. 3 to 7 before operation of the information processing apparatus 10 is described.

Figure 3:
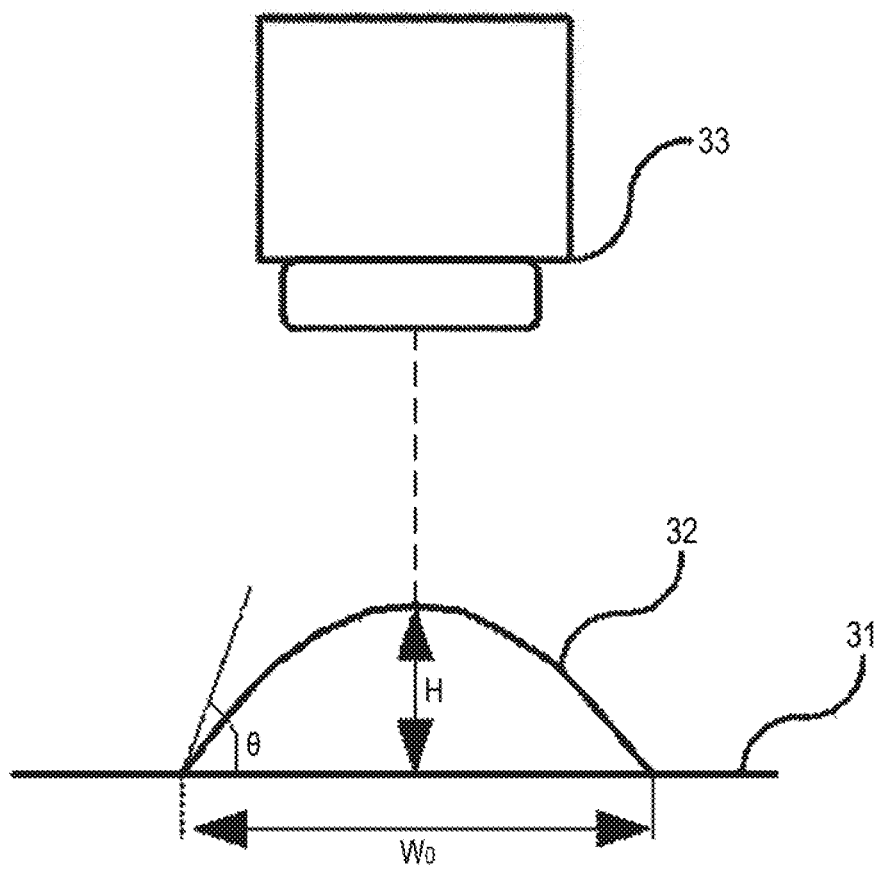
FIG. 3 is a schematic view illustrating an example of an ink ejected onto the recording medium according to the present exemplary embodiment.

Next, the ink 32 ejected onto the recording medium will be described with reference to FIG. 3. FIG. 3 is a schematic view illustrating an example of the ink 32 ejected onto the recording medium 31 according to the present exemplary embodiment.

As illustrated in FIG. 3, when the first drop of the ink 32 ejected from a nozzle 33 of the image forming apparatus comes into contact with the recording medium 31, a droplet is formed on the recording medium 31.

The information processing apparatus 10 acquires physical property information (an average pore diameter and surface uneven shape distribution of the recording medium 31, viscosity of the ink 32, surface tension, and the like). Here, the surface tension includes surface tension of the recording medium 31, surface tension of the ink 32, and surface tension between the recording medium 31 and the ink 32. A mode has been described in which the information processing apparatus 10 according to the present exemplary embodiment acquires the average pore diameter and the surface uneven shape distribution of the recording medium 31, the viscosity of the ink, and the surface tension as the physical property information. However, the present invention is not limited thereto. The information processing apparatus 10 may acquire information on physical properties which are an electrical resistance value, electrical conductivity, electrical polarizability, and the like of the recording medium 31 and the ink 32 as the physical property information.

The information processing apparatus 10 acquires the setting information (a volume of the ink, a distance between nozzles, the printing speed, a distance between heads, and the image density designated by the user) of the image forming apparatus. The volume of the ink according to the present exemplary embodiment is constant, and the printing speed is a speed at which the ink is ejected from the ejection of the first drop of the ink to the ejection of the second drop of the ink.

The information processing apparatus 10 derives, using the acquired physical property information, the contact angle of the recording medium 31 illustrated in FIG. 3 and a permeation coefficient when the ink 32 permeates the recording medium 31. The contact angle and the permeation coefficient are expressed by the following equations.

$$\cos\theta = \frac{\sigma_s - \sigma_{fs}}{\sigma_f} \qquad (1)$$

$$\beta = \sqrt{\frac{r\sigma_f \cos\theta}{2\mu}} \qquad (2)$$

Here, $\theta$ is the contact angle of the ink 32 in contact with the recording medium 31, $\sigma_s$ is the surface tension of the recording medium 31, $\sigma_f$ is the surface tension of the ink 32, and $\sigma_{fs}$ is the surface tension between the recording medium 31 and the ink 32. $\beta$ is the permeation coefficient, r is the average pore diameter of the recording medium 31, and $\mu$ is the viscosity of the ink 32.

As illustrated in FIG. 3, the wetting and spreading width of the ink 32 formed on the recording medium 31 is expressed by the following equations.

$$\tan\theta = \frac{2H}{W_0} \qquad (3)$$

$$V_0 = \frac{\pi}{6} H \left\{ 3 \left( \frac{W_0}{2} \right)^2 + H^2 \right\} \qquad (4)$$

Here, H is a height of a vertex of the ink 32, $W_0$ is the wetting and spreading width of the ink 32, and $V_0$ is the volume of the ink 32.

That is, using Equations (1), (3), and (4), the wetting and spreading width $W_0$ of the ink 32 is expressed using the volume $V_0$ and surface tension of the ink 32. That is, the wetting and spreading width $W_0$ is derived using the acquired physical property information.

Figure 4:
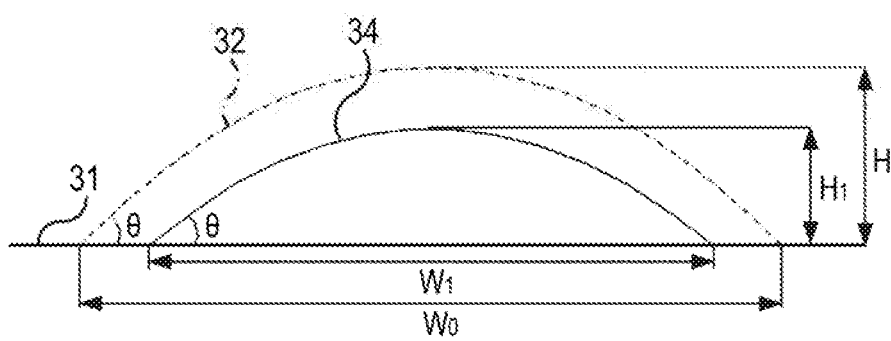
FIG. 4 is a schematic diagram showing an example of the ejected ink for describing a wetting and spreading width according to the present exemplary embodiment.

Next, a method of deriving the wetting and spreading width of the ink which remains on the recording medium 31 will be described with reference to FIG. 4. FIG. 4 is a schematic diagram showing an example of the ejected ink for describing the wetting and spreading width according to the present exemplary embodiment.

The ink 32 ejected from the nozzle 33 onto the recording medium 31 permeates the recording medium 31 as time elapses, and a volume of the ink 34 present on the recording medium 31 decreases as compared with a volume of the ink 32 immediately after the ejection. When an amount of the ink which permeates the recording medium 31 as time elapses is subtracted from the volume $V_0$ of the ink 32 immediately after the ejection, the volume of the ink 34 when any time has elapsed is derived, and the wetting and spreading width when any time has elapsed is derived from the volume of the ink 34.

When any time is time from the ejection of the first drop of the ink to the ejection of the second drop of the ink, the time from the ejection of the first drop of the ink to the ejection of the second drop of the ink is expressed by the following equation.

$$t_2 = \frac{d_h}{v} \qquad (5)$$

Here, $t_2$ is the time from the ejection of the first drop of the ink 32 to the ejection of the second drop of the ink, v is a printing speed at which the second drop of the ink is ejected after the first drop of the ink 32 is ejected, and $d_h$ is a distance between the heads of the image forming apparatus. When it is considered that the ink that permeates the recording medium 31 decreases as time elapses, the time from the ejection of the first drop of the ink to the ejection of the second drop of the ink is expressed by the following equation.

$$t_2 = \exp\left(-k_1 \frac{d_h}{v}\right) \qquad (6)$$

Here, $k_1$ is any coefficient. $k_1$ is derived in consideration of a contact area of the recording medium 31, a filling degree of a gap on the recording medium 31, and the like.

The amount of the ink which has permeated the recording medium 31 is expressed by the following equation using Equations (2) and (5) or (6) described above and the wetting and spreading width $W_0$ immediately after the ejection.

$$\Delta V = \frac{\pi}{4} \beta \sqrt{t_2}\, W_0^2 \qquad (7)$$

Here, $\Delta V$ represents the amount of the ink which permeates the recording medium 31 from the surface where the ink 32 immediately after the ejection is in contact with the recording medium 31. Therefore, the volume of the ink 34 when the time from the ejection of the first drop of the ink to the ejection of the second drop of the ink has elapsed is expressed by the following equation.

$$V_1 = V_0 - \Delta V \qquad (8)$$

Here, $V_1$ is the volume of the ink 34 which remains on the recording medium 31 when the time from the ejection of the first drop of the ink to the ejection of the second drop of the ink has elapsed.

Therefore, the wetting and spreading width of the ink 34 is derived by applying the volume $V_1$ of the ink 34 to the following equations. A wetting and spreading width $W_1$ of the ink 34 is expressed by the following equations.

$$\tan\theta = \frac{2H_1}{W_1} \qquad (9)$$

$$V_1 = \frac{\pi}{6} H_1 \left\{ 3\left(\frac{W_1}{2}\right)^2 + H_1^2 \right\} \quad (10)$$

Here, $H_1$ is a height of a vertex of the ink 34, and $W_1$ the wetting and spreading width of the ink 34. Therefore, the wetting and spreading width $W_1$ of the ink 34 when the time from the ejection of the first drop of the ink to the ejection of the second drop of the ink has elapsed is derived using the physical property information and the setting information.

Figure 5:
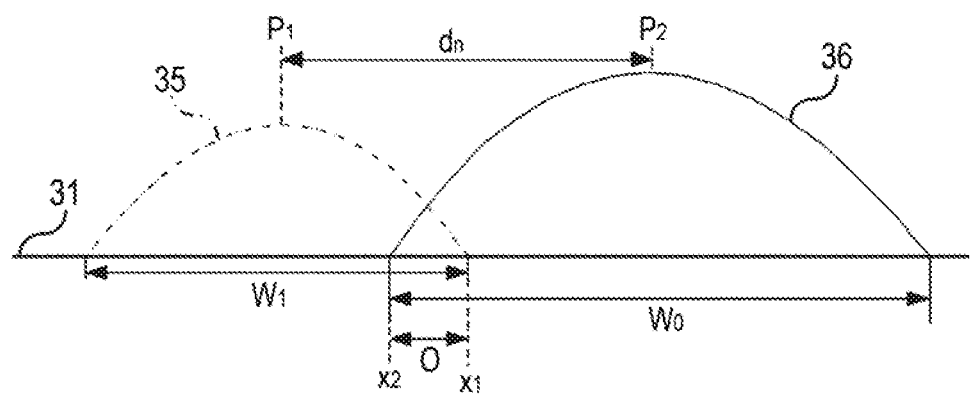
FIG. 5 is a schematic diagram showing an example of ejected two drops of the ink for describing an overlapping amount according to the present exemplary embodiment.

Next, a method of deriving the overlapping amount of the inks will be described with reference to FIG. 5. FIG. 5 is a schematic diagram showing an example of ejected two drops of the ink for describing the overlapping amount according to the present exemplary embodiment.

As shown in FIG. 5, when a second drop of an ink 36 is ejected to a position adjacent to a first drop of an ink 35 that has been ejected onto the recording medium 31, respective positions of the ink 35 and the ink 36 overlap each other, and thus coalescence occurs. As shown in FIG. 5, an overlapping amount of respective edges of the ink 35 and the ink 36 is derived using the positions to which the ink 35 and the ink 36 have been ejected and the setting information. A position of the edge of the ink 35, a position of a vertex to which the ink 36 is ejected, and a position of the edge of the ink 36 that is adjacent to the ink 35 are expressed by the following equations.

$$x_1 = P_1 + \frac{W_1}{2} \quad (11)$$

$$P_2 = P_1 + d_n \quad (12)$$

$$x_2 = P_2 - \frac{W_0}{2} \quad (13)$$

Here, $x_1$ is the position of the edge of the ink 35, $P_1$ is a position of a vertex of the ink 35, $P_2$ is a position of a vertex of the ink 36, and $d_n$ is a distance between the nozzles of the image forming apparatus. $x_2$ is a position of the edge of the ink 36 that is adjacent to the ink 35, and $W_0$ is the wetting and spreading width of the ink 36. Therefore, the positions of the respective edges of the ink 35 and the ink 36 are derived using the position of the vertex of the ink 35 and the setting information. The overlapping amount of the ink 35 and the ink 36 is expressed by the following equation using the positions of the respective edges of the ink 35 and the ink 36.

$$O = x_1 - x_2 \quad (14)$$

Here, O is the overlapping amount of the ink 35 and the ink 36.

When the position $P_1$ of the vertex of the ink 35 is determined, the position $x_1$ of the edge of the ink 35, the position $P_2$ of the vertex of the ink 36, and the position $x_2$ of the edge of the ink 36 are derived, and the overlapping amount O is derived. That is, the position $x_1$ of the edge of the ink 35, the position $P_2$ of the vertex of the ink 36, the position $x_2$ of the edge of the ink 36, and the overlapping amount of the ink 35 and the ink 36 are derived using the position $P_1$ of the vertex of the ink 35 set at an origin and the setting information.

A probability (hereinafter referred to as "coalescence probability") that the ink 35 and the ink 36 will coalesce is derived using the derived overlapping amount. The coalescence probability is expressed by the following equation.

$$R = \frac{O}{d_n} \quad (15)$$

Here, R is the coalescence probability. Equation (15) indicates that the larger the overlapping amount O of the ink 35 and the ink 36, the larger the coalescence probability is, and the coalescence of the ink 35 and the ink 36 is more likely to occur.

Figure 6:
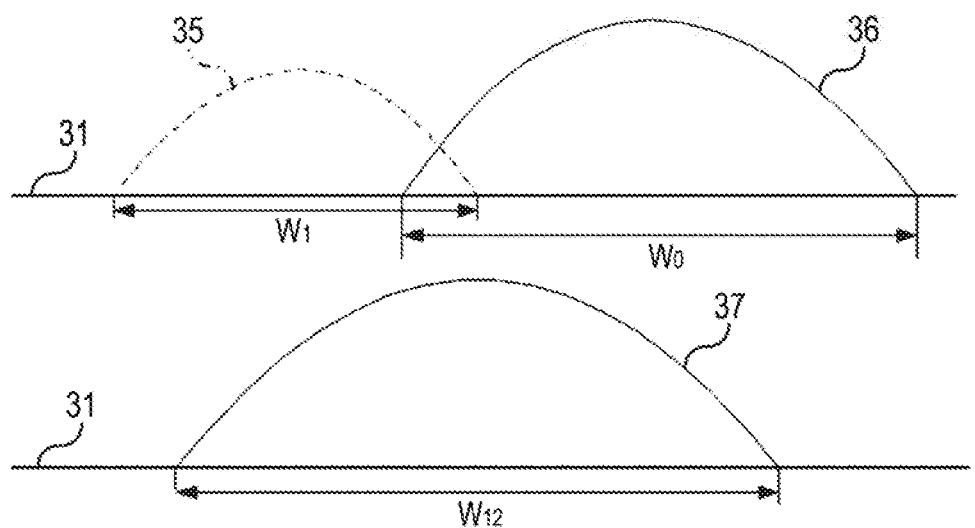
FIG. 6 is a schematic diagram showing an example of the ejected two drops of the ink for describing a wetting and spreading width of the ink in a case of coalescence according to the present exemplary embodiment.

Next, the wetting and spreading width of the ink in a case of coalescence and the derivation of the image density of the ink will be described with reference to FIG. 6. FIG. 6 is a schematic diagram showing an example of the ejected two drops of the ink for describing the wetting and spreading width of the ink in the case of coalescence according to the present exemplary embodiment. An upper part of FIG. 6 shows an example when the ink 35 and the ink 36 coalesce, and a lower part of FIG. 6 shows an example when the ink 35 and the ink 36 become one ink 37.

As shown in the upper part of FIG. 6, an example will be described in which the ink 35 has a wetting and spreading width $W_1$ and the ink 36 has a wetting and spreading width $W_2$.

As shown in the lower part of FIG. 6, when the ink 35 and the ink 36 coalesce and become one droplet, the wetting and spreading width of the ink 37 after the coalescence changes. The ink 37, which has coalesced into one droplet, is derived by the following equations.

$$V_{12} = V_1 + V_0 \quad (16)$$

$$\tan\theta = \frac{2H_{12}}{W_{12}} \quad (17)$$

$$V_{12} = \frac{\pi}{6} H_{12} \left\{ 3\left(\frac{W_{12}}{2}\right)^2 + H_{12}^2 \right\} \quad (18)$$

Here, $V_{12}$ is a volume of the ink 37 after the coalescence, $H_{12}$ is a height of a vertex of the ink 37 after the coalescence, and $W_{12}$ is the wetting and spreading width of the ink 37 after the coalescence.

If the ink 35 and the ink 36 that are shown in FIG. 6 coalesce at a moment when the second drop of the ink is ejected onto the recording medium 31, since the ink 35 corresponds to the first drop of the ink 34 after any time has elapsed shown in FIG. 4, a volume of the ink 35 is $V_1$. Since the ink 36 corresponds to the second drop of the ink, a volume of the ink 36 is $V_0$. Therefore, the volume $V_{12}$ of the ink 37 after the coalescence is expressed by Equation (16) described above.

The wetting and spreading width $W_{12}$ of the ink 37 after the coalescence is derived using the derived volume $V_{12}$ of the ink 37 after the coalescence and Equations (17) and (18).

Therefore, the ratio (the image density) of the ink to be ejected onto the recording medium 31 is derived using the wetting and spreading width $W_{12}$ of the ink 37 after the coalescence, the wetting and spreading width $W_1$ of the ink 35, and the coalescence probability R. The image density is expressed by the following equations.

$$W_3 = \frac{R}{100} \cdot W_{12} \cdot \frac{1}{2} + \frac{100 - R}{100} \cdot W_1 \quad (19)$$

$$S = \frac{\frac{\pi}{4}W_3^2}{d_n^2} \quad (20)$$

$$C = k_2 \cdot S \cdot (V_0 - \Delta V) + k_3 \quad (21)$$

Here, $W_3$ is an expected value of the wetting and spreading width of the ink which remains on the recording medium 31, S is the ratio (the ink area ratio) of the area of the ejected ink to the recording medium 31, and C is the image density of the image to be formed on the recording medium 31. $k_2$ and $k_1$ are any coefficient.

A first term on a right side of Equation (19) described above expresses an expected value when the ink coalesces by multiplying the wetting and spreading width $W_{12}$ after the coalescence by the coalescence probability R. The first term on the right side indicates the expected value of the wetting and spreading width per drop, and thus is multiplied by ½. A second term on the right side expresses an expected value of the wetting and spreading width of the ink in a case in which the coalescence does not occur by multiplying the wetting and spreading width $W_1$ of the ink 35 by a probability (1−R/100) that the coalescence does not occur. Therefore, Equation (19) described above expresses the wetting and spreading width $W_3$ of the ink which remains on the recording medium 31.

Equation (20) expresses an ink area ratio S which is a ratio of the ink in contact with the recording medium 31 to the recording medium 31.

Therefore, as indicated by Equation (21) described above, the image density C is expressed by multiplying the ink area ratio S by a volume $(V_0 - \Delta V)$ of the ink which remains on the recording medium 31. That is, the larger the ink area ratio to the recording medium 31, the higher the image density is, and the larger the volume of the ink which remains on the recording medium 31, the higher the image density is. In other words, Equation (21) described above indicates that the area ratio and the image density tend to increase as the recording medium 31 is rich in hydrophilicity and the ink spreads easily on the recording medium 31. Equation (21) described above further indicates that the volume of the ink which remains on the recording medium and the image density tend to increase as the ink is less likely to permeate the recording medium 31.

Figure 7:
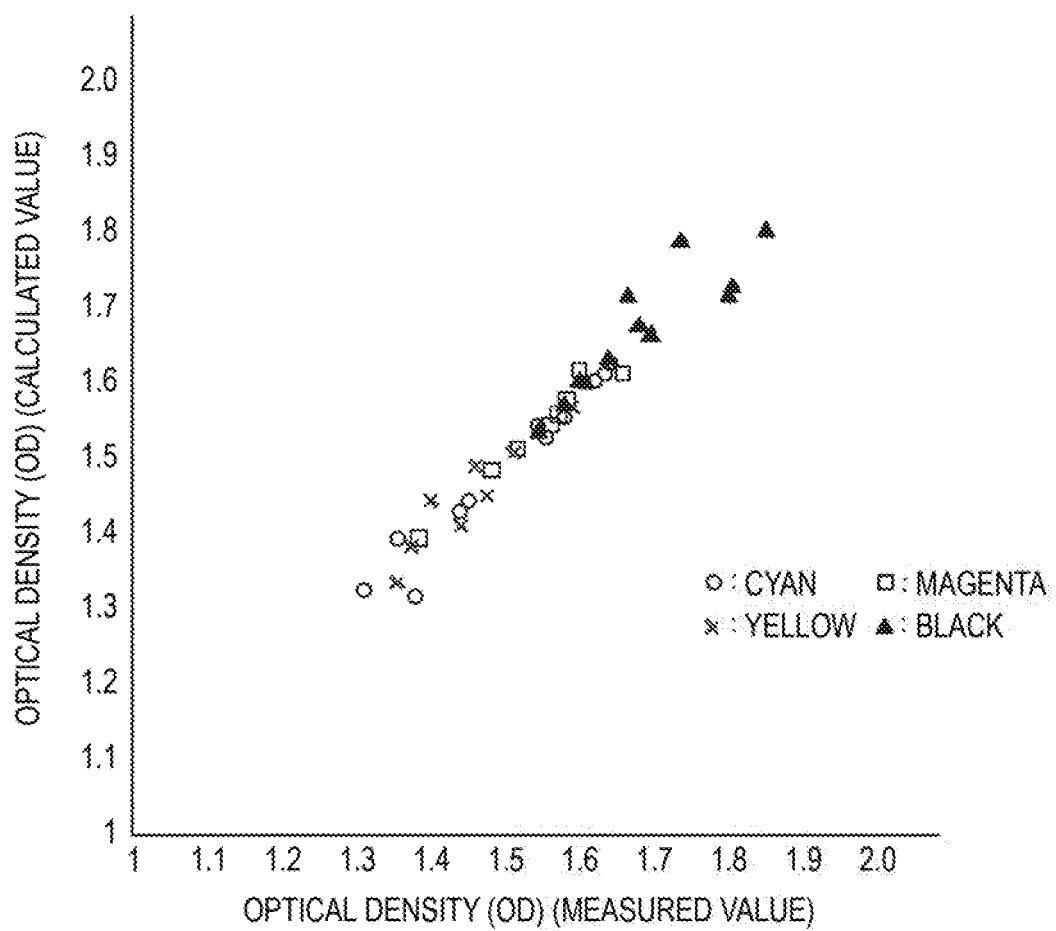
FIG. 7 is a graph showing an example of measured values and calculated values of an optical density according to the present exemplary embodiment.

Next, with reference to FIG. 7, a comparison result between the optical density of the ink derived by the simulation and an optical density of the ink obtained by ejecting the ink and actually measuring the ink will be described. FIG. 7 is a graph showing an example of measured values and calculated values of the optical density according to the present exemplary embodiment.

Here, FIG. 7 is an example in which the image density according to the present exemplary embodiment is measured as the optical density. FIG. 7 shows that there is a correlation between the calculated values and the measured values of the optical density for a type of an ink color.

As shown in FIG. 7, it may be apparent that a difference between the calculated values of the optical density for the type of an ink color according to the present exemplary embodiment and the measured values of the optical density for the type of an ink color is sufficiently small. That is, FIG. 7 shows that the quality of an image to be formed on the recording medium may be evaluated statistically from the behaviors of the first and second drops of the ink. Using FIG. 7, $k_1$, $k_2$, and $k_3$ with which the calculated values of the optical density match the measured values of the optical density may be derived.

Next, operation of the information processing program according to the present exemplary embodiment will be described with reference to FIG. 8. FIG. 8 is a flowchart showing an example of information processing according to the present exemplary embodiment. The CPU 11 reads the information processing program from the ROM 12 or the storage 14 and executes the information processing program to execute the information processing shown in FIG. 8. The information processing shown in FIG. 8 is executed when, for example, the user inputs an instruction to execute the information processing program.

In step S101, the CPU 11 acquires the physical property information.

In step S102, the CPU 11 acquires the setting information.

In step S103, the CPU 11 derives the image density.

In step S104, the CPU 11 determines whether a difference between the derived image density and an image density that is designated by the user and is included in the setting information exceeds a threshold value. When the difference exceeds the threshold value (step S104: YES), the CPU 11 proceeds to step S105. On the other hand, when the difference does not exceed the threshold value (step S104: NO), the CPU 11 ends the processing.

In step S105, the CPU 11 notifies the user that the difference exceeds the threshold value and the quality of the image to be formed is poor. Here, as the notification processing, a content to be notified may be displayed on a monitor, or the content to be notified may be transmitted to a terminal of the user.

In step S106, the CPU 11 corrects a value of an item in the setting information and sets the corrected value in the setting information. As an example, the item to be corrected in the setting information is the printing speed. A mode has been described in which the item to be corrected in the setting information is the printing speed, according to the present exemplary embodiment. However, the present invention is not limited thereto. For example, in the setting information, the volume of the ink to be ejected may be corrected.

In step S107, the CPU 11 derives the image density using the corrected setting information.

In step S08, the CPU 11 determines whether the difference between the derived image density and the image density that is designated by the user and is included in the setting information is equal to or lower than the threshold value. When the difference is equal to or lower than the threshold value (step S108: YES), the CPU 11 proceeds to step S109. On the other hand, when the difference is higher than the threshold value (step S108: NO), the CPU 11 proceeds to step S106.

In step S109, the CPU 11 notifies the user of the corrected setting information.

The information processing program according to the present exemplary embodiment has described a mode in which the user is notified of the corrected setting information. However, the present invention is not limited thereto. For example, the corrected setting information may be set as setting information at a time of actually forming an image.

As described above, by estimating the behaviors of the first and second drops of the ink using the physical property information and the setting information, the image density of the image to be formed on the recording medium 31 is derived, and information on the quality of the image is statistically derived. Therefore, according to the present exemplary embodiment, processing time for deriving the information on the quality of the image may be reduced as compared with a case of simulating the behavior of each ink for an entire region to be printed.

The configuration of the information processing apparatus 10 described in the above exemplary embodiment is an example, and may be changed depending on a situation without departing from the gist of the present disclosure.

The processing flow of the program described in the above exemplary embodiment is also an example, and an unnecessary step may be deleted, a new step may be added, or the processing order may be changed without departing from the gist of the present disclosure.

In the exemplary embodiments above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the exemplary embodiments above, the term "processor" is broad enough to encompass one processor or plural processors in collaboration which are located physically apart from each other but may work cooperatively. The order of operations of the processor is not limited to one described in the exemplary embodiments above, and may be changed.

In the above exemplary embodiment, instead of being stored (installed) in the storage medium 14 in advance, the program PR may be provided by being recorded in a recording medium such as a compact disc read only memory (CD-ROM), a digital versatile disc read only memory (DVD-ROM), and a universal serial bus (USB) memory, or may be downloaded from an external device via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising a processor configured to:
    acquire physical property information on physical properties of a recording medium and on physical properties of ink to be ejected onto the recording medium and setting information on a setting of a device configured to eject the ink onto the recording medium, the ink including a first ink and a second ink;
    derive a feature quantity relating to characteristics of the ink by estimating behavior of a first ink to be ejected onto the recording medium and of a second ink to be ejected to a position adjacent to the first ink ejected, using the physical property information and the information on a setting to derive a feature quantity relating to characteristics of the recording medium; and
    output the feature quantity.

2. The information processing apparatus according to claim 1, wherein
    the processor derives, as the feature quantity, an image density of an image to be formed on the recording medium.

3. The information processing apparatus according to claim 2, wherein
    the processor derives the image density using an ink area ratio indicating a ratio of an area in which the ink is ejected to an area of the recording medium and a remaining amount of the ink which remains on the recording medium.

4. The information processing apparatus according to claim 3, wherein
    the processor derives the remaining amount using a permeation amount of the first ink.

5. The information processing apparatus according to claim 4, wherein
    the processor derives the ink area ratio using a wetting and spreading width of the first ink.

6. The information processing apparatus according to claim 5, wherein,
    in a case where a difference between the image density derived and a quantity of an item included in the setting information exceeds a threshold value, the processor notifies a user that a quality of an image to be formed on the recording medium is poor, the item being designated by the user.

7. The information processing apparatus according to claim 4, wherein,
    in a case where a difference between the image density derived and a quantity of an item included in the setting information exceeds a threshold value, the processor notifies a user that a quality of an image to be formed on the recording medium is poor, the item being designated by the user.

8. The information processing apparatus according to claim 3, wherein
    the processor derives the ink area ratio using a wetting and spreading width of the first ink.

9. The information processing apparatus according to claim 8, wherein,
    in a case where a difference between the image density derived and a quantity of an item included in the setting information exceeds a threshold value, the processor notifies a user that a quality of an image to be formed on the recording medium is poor, the item being designated by the user.

10. The information processing apparatus according to claim 3, wherein,
    in a case where a difference between the image density derived and a quantity of an item included in the setting information exceeds a threshold value, the processor notifies a user that a quality of an image to be formed on the recording medium is poor, the item being designated by the user.

11. The information processing apparatus according to claim 2, wherein,
    in a case where a difference between the image density derived and a quantity of an item included in the setting information exceeds a threshold value, the processor notifies a user that a quality of an image to be formed on the recording medium is poor, the item being designated by the user.

12. The information processing apparatus according to claim 1, wherein,
    in a case where a difference between the feature quantity and a quantity of an item included in the setting information exceeds a predetermined threshold value, the processor notifies a user that a quality of an image to be formed on the recording medium is poor, the item being designated by the user.

13. The information processing apparatus according to claim 12, wherein, in a case where the difference exceeds the threshold value, the processor derives corrected setting information with which the difference is equal to or lower than the threshold value and gives notice of the corrected setting information.

14. The information processing apparatus according to claim 13, wherein, in a case where the difference exceeds the threshold value, the processor corrects the setting information to achieve the difference equal to or lower the threshold value.

15. The information processing apparatus according to claim 12, wherein, in a case where the difference exceeds the threshold value, the processor corrects the setting information to achieve the difference equal to or lower the threshold value.

16. The information processing apparatus according to claim 15, wherein the processor corrects a printing speed included in the setting information to achieve the difference equal to or lower than the threshold value, and corrects the feature quantity.

17. A non-transitory computer readable medium storing a program causing a computer to execute a process for information processing, the process comprising:

acquiring physical property information on physical properties of a recording medium and on physical properties of ink to be ejected onto the recording medium and setting information on a setting of a device configured to eject the ink onto the recording medium, the ink including a first ink and a second ink;

deriving a feature quantity relating to characteristics of the ink by estimating behavior of a first ink to be ejected onto the recording medium and of a second ink to be ejected to a position adjacent to the first ink ejected, using the physical property information and the information on a setting to derive a feature quantity relating to characteristics of the recording medium; and outputting the feature quantity.

* * * * *